Figure 1:
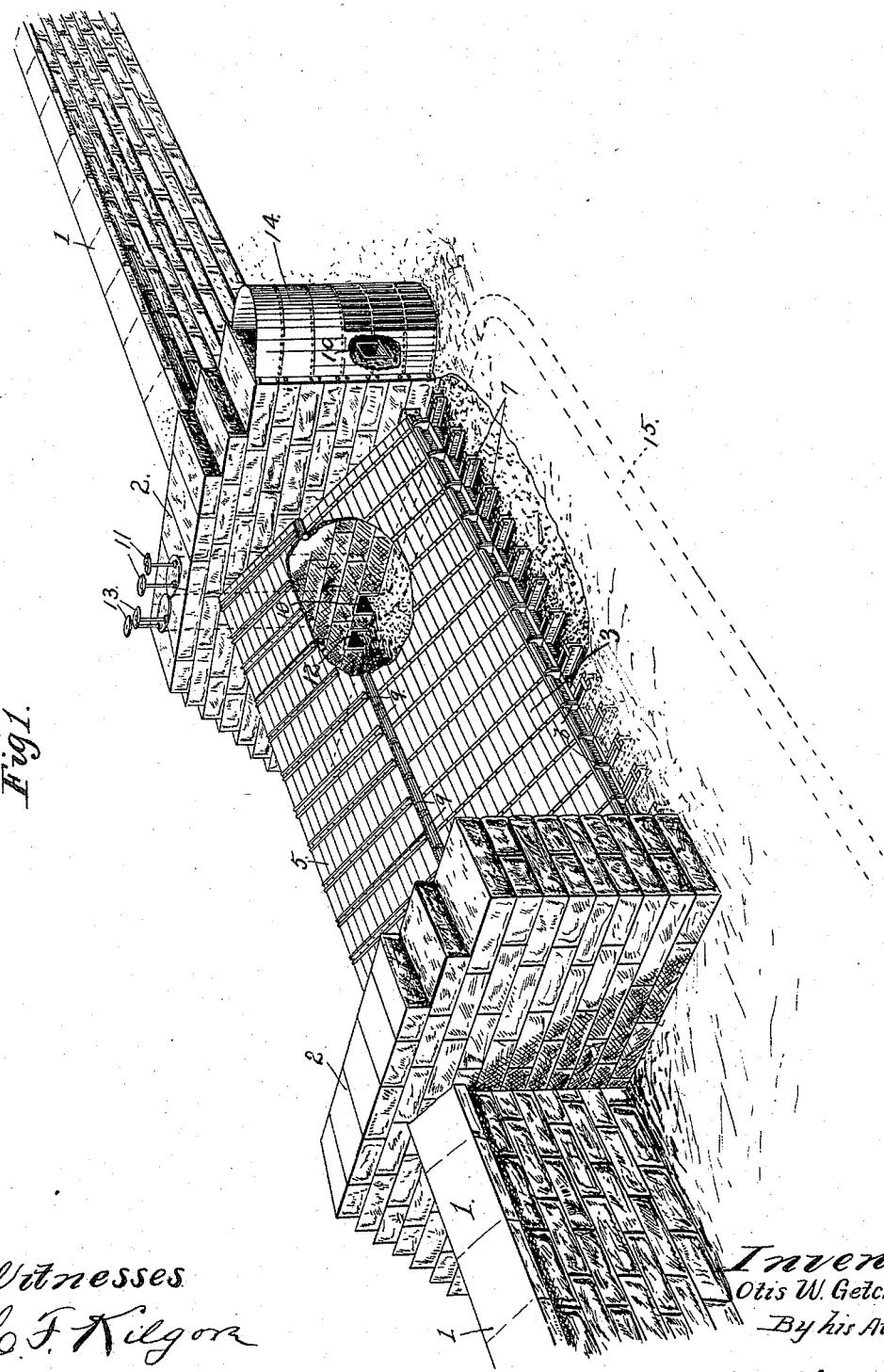

(No Model.) 3 Sheets—Sheet 1.

O. W. GETCHELL.
WATER TIGHT HINGED JOINT FOR BEAR TRAP DAMS OR OTHER USES.

No. 578,982. Patented Mar. 16, 1897.

Witnesses
C. F. Kilgore
C. D. Merchant

Inventor.
Otis W. Getchell
By his Attorney
Jas. F. Williamson

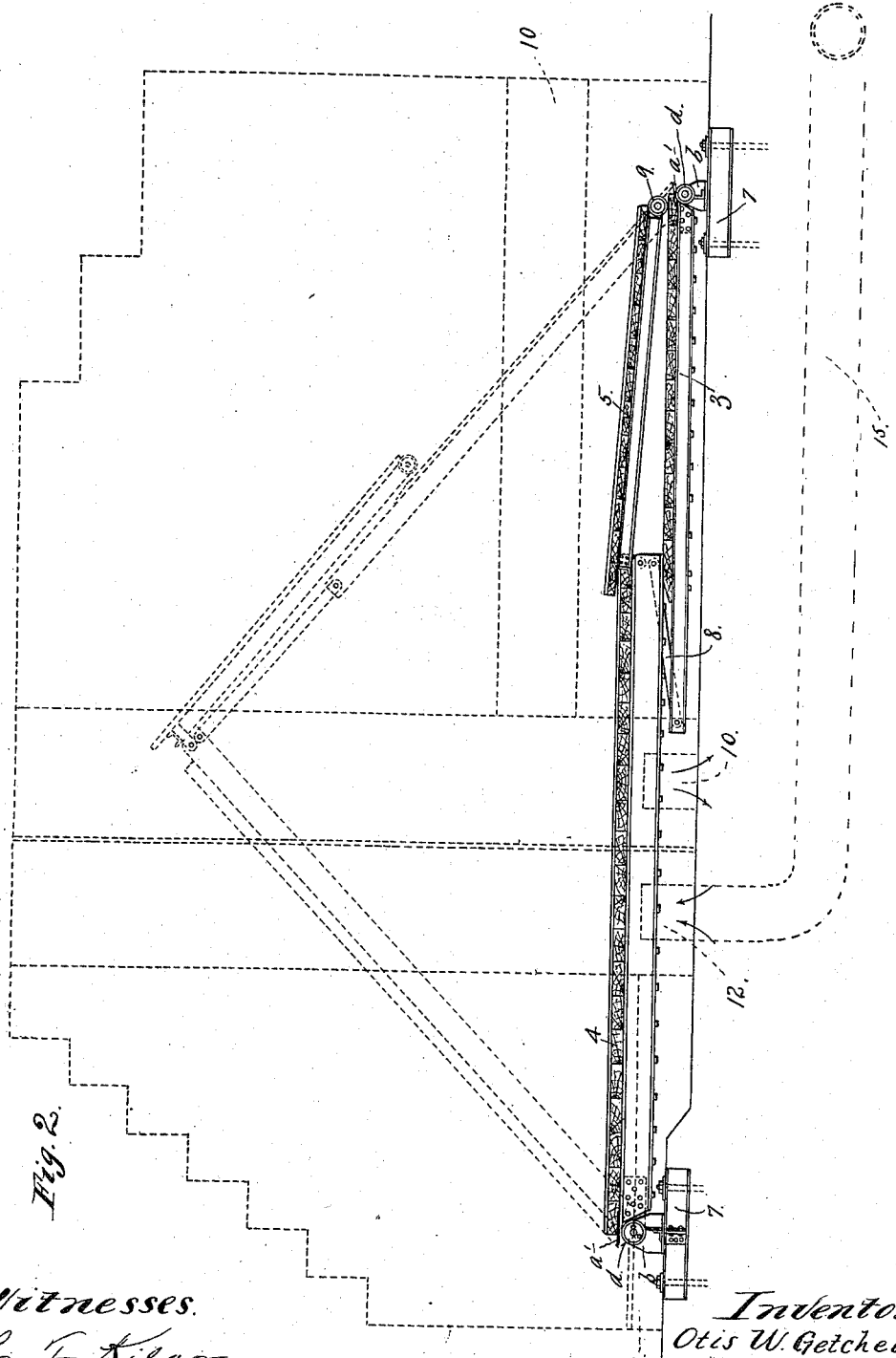

(No Model.) 3 Sheets—Sheet 3.
O. W. GETCHELL.
WATER TIGHT HINGED JOINT FOR BEAR TRAP DAMS OR OTHER USES.
No. 578,982. Patented Mar. 16, 1897.
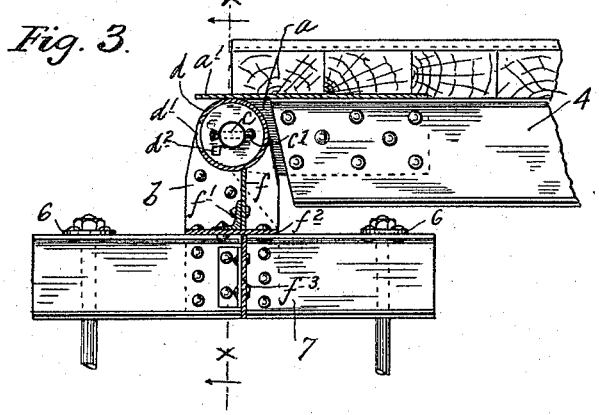
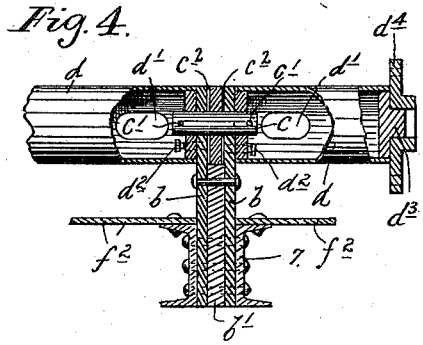
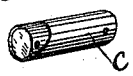
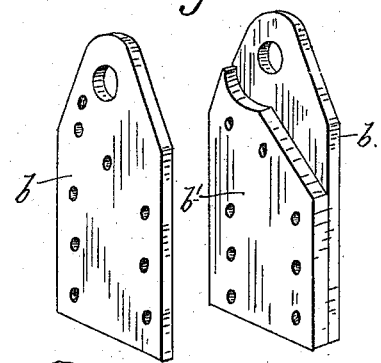
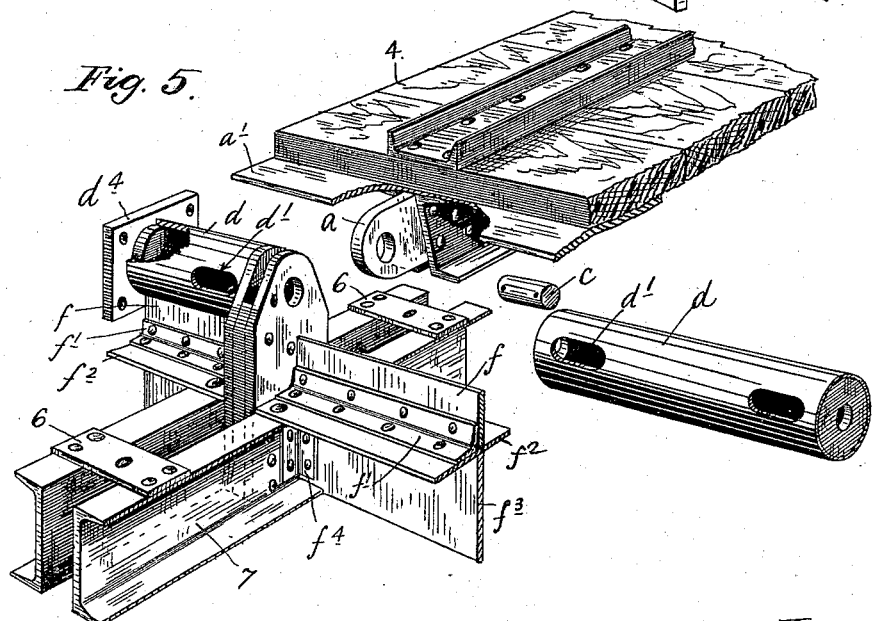
Witnesses
C. F. Kilgore,
P. D. Merchant.
Inventor
Otis W. Getchell
By his Attorney
Jas. F. Williamson
THE NORRIS PETERS CO., PHOTO-LITHO., WASHINGTON, D. C.

UNITED STATES PATENT OFFICE.

OTIS W. GETCHELL, OF MINNEAPOLIS, MINNESOTA.

WATER-TIGHT HINGED JOINT FOR BEAR-TRAP DAMS OR OTHER USES.

SPECIFICATION forming part of Letters Patent No. 578,982, dated March 16, 1897.

Application filed January 4, 1897. Serial No. 617,976. (No model.)

*To all whom it may concern:*

Be it known that I, OTIS W. GETCHELL, a citizen of the United States, residing at Minneapolis, in the county of Hennepin and State of Minnesota, have invented certain new and useful Improvements in Water-Tight Joints for Bear-Trap Dams or other Uses; and I do hereby declare the following to be a full, clear, and exact description of the invention, such as will enable others skilled in the art to which it appertains to make and use the same.

My invention has for its object to provide a water-tight hinged joint for bear-trap dams or other uses; and to this end the invention consists of the novel devices and combinations of devices hereinafter described, and defined in the claims.

As the invention is especially designed for bear-trap dams, it is illustrated in its application thereto in the accompanying drawings, wherein like notations refer to like parts throughout the several views.

Figure 1 is a perspective view of a dam containing my improved bear-trap with the leaves of the trap shown in their elevated position. Fig. 2 is a central section through the bear-trap lengthwise of the log way or passage in the dam controlled thereby with the trap-leaves shown in full lines in their lowermost position and in dotted lines in their uppermost position. Fig. 3 is a detail, partly in side elevation and partly in section, on the same line as in Fig. 2 through the joint adjacent to one pair of the hinge-lugs with some parts broken away. Fig. 4 is a detail, chiefly in section, on the line $x$ $x$ of Fig. 3. Fig. 5 is a perspective view illustrating the joint elements as they would appear when pulled apart from each other with some portions in section and others broken away. Fig. 6 is a perspective view of the coöperating plates which form the anchored members of the hinge-lugs with said plates shown detached and pulled apart from each other. Fig. 7 is a detail in perspective showing one of the brass-covered hinge-pins detached, and Fig. 8 is a similar view of one of the brass washers detached.

The numerals 1 represent sections of a main dam, and the numerals 2 represent piers therein spaced apart from each other to afford the log passage or channel for other purposes which is controlled by the bear-trap. Between the said piers 2 are mounted the articulated leaves 3, 4, and 5, constituting parts of the trap. The main leaves 3 and 4 are hinged to the anchored sills, which in this instance are shown as composed of channel-irons 7, held together by tie-plates 6, and made fast or anchored in any suitable way to the foundation of the bear-trap dam. The main leaves 3 and 4 are connected by folding links 8, and the leaf 5 is hinged to the leaf 4, with its lower end overlapping the leaf 3 and provided with pipe-section rollers 9, which travel on the upstream face of the main leaf 3 in the raising and lowering action of the trap-leaves, as clearly shown in Fig. 2.

Water is admitted underneath the trap-leaves through a supply-passage 10 in one of the piers controlled by wickets 11 for raising the trap and the water is permitted to escape from underneath the leaves through an outlet-passage 12, controlled by wickets 13 in the pier for lowering the trap. The mouth of the supply-passage 10 is shown as protected by a suitable cage 14. From the outlet-well in the pier to which the escape-passage 12 leads I extend one discharge-pipe (not shown) to a point below the dam and extend another pipe 15 to the wheel-pit in the power-house. (Not shown.)

The general features of the bear-trap so far specified are substantially the same as those employed in the most approved modern bear-traps, the operation of which traps is well understood and for the purposes of this case needs no further description.

Turning now to a consideration of my improved water-tight joint as applied to the bear-trap shown, attention is especially directed to Fig. 2 and the details shown in Figs. 2 to 8, inclusive. The main leaves 3 and 4 of the trap are shown as provided with male hinge-lugs and with follower or lap plates extending downward over the lugs, (marked $a$ and $a'$, respectively.) The female hinge-lugs for coöperation with the male lugs $a$ are made up of outer plates $b$ and intermediate filling and spacing plates $b'$, (shown best in Fig. 6,) which plates $b$ and $b'$ are riveted together and in the present instance are shown as embraced by the channel-irons forming the anchor-sills 7 and are riveted thereto, as shown best in Fig. 5. The filling member $b'$ of the plates making up the female hinge-lugs is cut away at its upper end, as best shown in Fig. 6, to afford the necessary clearance for the pivotal movement of the male lug $a$, but at all other points fills the entire space between the outer plates $b$. Brass-covered hinge-pins $c$ with holes for cotters $c'$ connect the hinge-lugs. Spacing and filling cylinders $d$, closed at their ends, with the exception of axial holes for the ends of the hinge-pins $c$, abut at their ends against the female hinge-lugs and are secured against rotation in respect to the said female lugs. As shown, the said cylinders $d$ are carried by the hinge-pins $c$ and are made fast to the said lugs by tap-screws $d^2$ or other suitable means. The cylinders $d$ are provided with hand-holes $d'$, facing the outside of the dam, for use in the insertion and removal of the hinge-pins $c$ and the cylinder-securing screws $d^2$.

Directly below the cylinders $d$ and in advance of the axes of said cylinders are located yielding or spring-action filling or abutment plates $f$, which are water-packed against the under surfaces of said cylinders $d$ in advance of the axes or centers of said cylinders. In the present instance the said abutment-plates $f$ are shown as secured by angle-irons $f'$ to horizontal plates $f^2$, which are riveted to the channel-irons 7, forming the anchor-sills. Below the horizontal plates $f^2$ and abutting the channel-irons 7 are located plates $f^3$, which are secured to said channel-bars and the plate $f^2$ by corner angle-irons $f^4$, with all of said parts securely riveted together. The said plates $f^3$ fill the space between the anchor-sills, the dam-foundation, and the horizontal plates $f^2$. The yielding or spring plates $f$ fill the space between the horizontal plates $f^2$ and the cylinders $d$, and the cylinders $d$ fill the space between the abutment or spring plates $f$ and the follower-plates $a'$, carried by the pivotally-connected part having the male lugs $a$. The said follower-plates bear constantly on the upper surfaces of the cylinders $d$ under the pivotal movement.

Between the outer members $b$ of the female hinge-lugs and the male hinge-lugs $a$ are mounted, on the hinge-pins $c$, brass washers $c^2$, which maintain a comparatively tight joint between the coöperating male and female hinge-lugs. The hinge-pins $c$ are brass-covered, and the washers $c^2$ are made of brass, so as to provide wearing-surfaces which will not corrode.

The particular joint shown in the enlarged detail views, Figs. 3 to 8, inclusive, is the downstream bottom joint of the bear-trap dam. The upstream joint is identical therewith, with the exception that the cylinders $d$ are set with their hand-holes $d'$ facing upstream instead of downstream, as in the joint hitherto considered.

When the elements constituting this joint are properly assembled in working position, it is obvious that no openings are afforded for the passage of the water from underneath the trap-leaves outward, and hence the full pressure of the water underneath the leaves is rendered available for raising the trap, it being understood, of course, that the ends of the leaves work against the pier-walls with a sufficiently-close joint for all practical purposes. The fact that the water-pressure underneath the traps is available on the spring abutment-plates $f$ to pack the same against the under surfaces of the cylinders $d$ insures an extremely tight joint at that point.

The particular cylinders $d$, located adjacent to the piers, are provided with trunnion-lugs $d^3$, which fit into socket-plates $d^4$, that are anchored to the pier-walls. The angle-irons $f'$ and $f^4$, which secure the plates $f$, $f^2$, and $f^3$ together and to the channel-bars 7, are applied to the outside surfaces of the joint or on the downstream side of the particular joint illustrated in Figs. 3 to 8, inclusive. The fact of the multiplicity of hinge-pins $c$ and spacing-cylinders $d$ permits the leaves to be articulated in sections and the filling-plates to be applied in the same way. This is a great convenience for the use illustrated. When the parts of this joint are properly assembled, all the elements thereof which are liable to get out of order or to need substitution or repairs are readily accessible from the outside of the dam.

Although the invention has thus been illustrated and described as applied for use in bear-traps for dams, it will be understood that the joint is capable of general use wherever similar functions are required. Otherwise stated, the invention is capable of use wherever it is desired to secure a water-tight joint between pivotally-connected parts, and especially where water-pressure is available on one side of the joint.

What I claim, and desire to secure by Letters Patent of the United States, is as follows:

1. A water-tight hinge-joint, for bear-trap dams or other uses, comprising spacing-cylinders and a follower-plate coöperating to fill and close the joint-space between the hinge-connected parts, substantially as described.

2. A water-tight hinge-joint, for bear-trap dams or other uses, comprising cylinders in the joint-space between the pivotally-connected parts, a follower-plate lapping the top surfaces of said cylinders, in the pivotal movement, and a yielding or spring abutment-plate water-pressed against the under surfaces of said cylinders, substantially as described.

3. A water-tight hinge-joint for bear-trap dams or other uses, comprising male and female hinge-lugs, closed cylinders in the joint-space between the pivotally-connected parts, with the ends of said cylinders abutting the female hinge-lugs, and said cylinders provided with hand-holes for the insertion and removal of the hinge-pins and other parts, a follower-plate lapping the top surfaces of said cylinders, and a yielding or spring abutment-plate water-pressed against the under surface of said cylinders, substantially as described.

4. A water-tight joint, for bear-trap dams or other uses, involving male and female hinge-lugs, spacing and filling cylinders in the joint-space between the hinge-connected parts, with their ends abutting said female hinge-lugs, and a yielding abutment-plate water-packed against the under surfaces of said cylinders, substantially as described.

5. In a bear-trap dam, the combination with a main leaf having the male hinge-lugs $a$ and the follower-plates $a'$, of the female hinge-lugs made up of the plates $b\ b'$ riveted together set between and riveted to channel-irons forming the anchored sills, the spacing-cylinders $d$ carried by the hinge-pins, provided with the hand-holes $d'$ and locked to the female hinge-lugs, the yielding or spring abutment-plates $f$, the horizontal plates $f^2$, the bottom filling-plates $f^3$ and the angle-irons $f'\ f^4$ all arranged and operating, substantially as described.

6. In a bear-trap for dams, the combination with a main leaf having the hinge-lug $a$ and follower-plate $a'$, of the anchored lugs composed of the plates $b\ b'$, as described, the anchored sills composed of the channel-bars 7 tied together and embracing said anchored lugs with said lugs made fast thereto, the spacing-cylinders $d$ with hand-holes $d'$ carried on the hinge-pin $c$ and held against rotation with their hand-holes facing downstream, the filling-plates $f\ f^3$ below said cylinders, the angle-irons $f'\ f^4$ and the socket-plates $d^4$, all arranged and operating substantially as described.

In testimony whereof I affix my signature in presence of two witnesses.

OTIS W. GETCHELL.

Witnesses:
WM. DE LA BARRE,
JAS. F. WILLIAMSON.